United States Patent

[11] 3,616,045

[72] Inventors Laszlo Kozar
Tatabanya;
Mihaly Toth; Jozsef Uveges, Budapest;
Endre Pataki, Biscke; Sandor Kota,
Tatabanya, all of Hungary
[21] Appl. No. 799,997
[22] Filed Feb. 17, 1969
[45] Patented Oct. 26, 1971
[73] Assignee Tatabanyai Aluminiumkoho
Tatabanya, Hungary

[54] PROCESS FOR INCREASING THE STRENGTH AND ELECTRICAL CONDUCTIVITY OF GRAPHITE OR CARBON ARTICLES AND/OR FOR BONDING SUCH ARTICLES TO EACH OTHER, TO CERAMIC ARTICLES OR TO METALS
7 Claims, No Drawings

[52] U.S. Cl.................................................. 156/326,
117/DIG. 11, 156/155
[51] Int. Cl.....................................................C23c 17/00,
B01k 5/00, C23k 13/00
[50] Field of Search............................................ 117/228;
260/347.8; 29/458, 472.9, 473.1, 491, 492;
156/155, 326

[56] References Cited
UNITED STATES PATENTS
| | | | |
|---|---|---|---|
| 2,962,386 | 11/1960 | Doll et al. ..................... | 117/228 X |
| 2,972,552 | 2/1961 | Winter ......................... | 117/228 X |

*Primary Examiner*—William L. Jarvis
*Attorney*—Young & Thompson

ABSTRACT: An impregnating composition for increasing the strength and electrical conduction of graphite and carbon articles, comprises 60–90 percent by volume furfurol or furfuryl alcohol, 5–20 percent by volume anthracene oil, and as a catalyst either 2 to 25 percent by volume phosphoric acid or 5 to 35 percent by volume of titanium ethyl ester. A bonding composition for impregnating and bonding graphite and carbon articles to each other and to ceramic articles and metals, comprises this impregnating composition in an amount 20 to 80 percent by weight, 1 to 15 percent by weight of boric acid or boric oxide, and the rest a filler, which can be TiC, $TiB_2$, SiC, $B_4C$, BN, CaO, $Al_2O_3$, powdered coke, graphite or a mixture thereof. To impregnate or bond, the impregnating composition or bonding composition is applied and the articles are heated at 80 to 250° C. for 2 to 10 hours, and then carbonized at 300° to 1,500° C.

PROCESS FOR INCREASING THE STRENGTH AND ELECTRICAL CONDUCTIVITY OF GRAPHITE OR CARBON ARTICLES AND/OR FOR BONDING SUCH ARTICLES TO EACH OTHER, TO CERAMIC ARTICLES OR TO METALS

The invention relates to a process for increasing the strength and electrical conductivity of graphite or carbon articles and/or for bonding such articles to each other, to ceramic articles or to metals.

Various apparatuses used in chemical engineering and metallurgy are known from the literature and from actual practice, which have to be lined with prebaked carbon or graphite moulded specimens or plates, so as to make the apparatus resistant to thermal and chemical actions. Another field where carbon and graphite articles are widely used is that of electrically conductive electrodes, for example in fusion electrolysis cells and electric arc furnaces.

Carbon or graphite articles of the type described above employed in chemical engineering or metallurgy have to satisfy two kinds of requirements. In the first place, they must have high mechanical strength, good conduction and very low porosity in most cases, depending on the field of use. In addition, when such carbon or graphite specimens are incorporated in apparatuses, the main requirements are to achieve good bonding of the articles to each other, to ceramics and metals. In certain special fields, for example when used as electrodes, the surfaces to be bonded should have the lowest possible electrical contact resistance.

If the graphite or carbon articles incorporated in chemical apparatuses are of high strength, the lining shows increased resistance to mechanical strain. In equipment operating at high temperature, the thermal expansion due to the heating-up of the furnace results in exceedingly high stresses forces. In fusion electrolysis cells, for example, the absorption of certain components of the melt which have come into contact with the lining gives rise to high internal stresses in the graphite or carbon, also during operation. Harmful mechanical effects may also be caused by varying operation temperatures, by batchwise operation, or by nonuniform distribution of the temperature along the lining. In some cases the linings are combined or contacted with materials, e.g. metals, the heat expansion coefficients of which exceed by a multiple that of the graphite or carbon articles. So, for example, in electrodes only these parts exposed to high temperatures and corrosive actions are made of graphite or carbon, whereas the current conductors or leads associated with them consist of metals. These are generally disposed in such a manner that a cavity is formed in the carbon specimen, and the conductor placed in it is coated with carbon or with a molten metal, for example steel. The metal having a thermal expansion coefficient exceeding that of the carbon, a subsequent increase of temperature will necessarily give rise to very high stresses which are bound to cause mechanical damage to the faces of the cavities. Such a procedure takes place e.g. in aluminum electrolysing cells, when the current conductors are laid in the grooves formed in the negative carbon.

Owing to the large dimensions and complicated shapes, the graphite or carbon lining can hardly ever be monolithically formed but has to be assembled of several smaller elements. In certain cases, such as forming the cathodes of aluminum electrolysis cells, it is more convenient to use several smaller carbon or graphite specimens, in view of the anisotropy of the negative carbon due to the pressing step in its manufacture. This has been found essential in order to achieve during operation a correspondence between the direction of the current in the current conducting cathode lining, and the direction of pressing of the carbon block during operation. This is important, because the strength, the specific resistance, and the tendency for spalling of graphite or carbon articles is considerably greater in the direction of pressing than transversely thereto. The lining is preferably so constituted of several elements as to achieve a close adherence between the individual elements. Another requirement is that neither chemical corrosion should take place nor should gaps be formed between the adjacent faces of the lining. Finally, electrical contact resistance between the contacting faces should be kept at a minimum.

In order to improve the properties of graphite and carbon articles it has been suggested to impregnate the formed and baked articles, mostly with pitch, and subsequently rebake them. Pitch as impregnating material has the drawback of entailing lengthy impregnating times or requiring high temperatures of impregnation, since it does not sufficiently wet the graphite or carbon. A further disadvantage consists in the need for preheating the articles prior to impregnation.

According to recent methods 15 to 50 percent of furfurol are added to the pitch. According to British Pat. No. 928,532, a mixture of furfuryl alcohol with 2 percent of phosphoric acid has been suggested as impregnating agent for rendering graphite impermeable.

The process suggested in these patents involves high costs on the one hand, since the disadvantageous properties of the impregnating agents require several stages of operation. On the other hand, due to the same reasons, the strength and electrical conduction of the carbon and graphite are not materially increased, since the small pores or interstices are not filled up by the impregnating agent. Still another disadvantage resides in the fact that the heat treatment necessary for polymerization following impregnation can be accomplished only in accordance with a very strict programming of temperature time, which in turn involves expensive equipment. Finally, due to nonuniform polymerization, neither agglomeration, nor the improvement of properties is uniform over the entire cross section of the articles.

In view of the drawbacks described above, the strength, electrical conduction and density of the graphite or carbon blocks can be only slightly increased by means of the known impregnating agents, whereas the costs of impregnation and subsequent baking are excessively high.

A number of binders are known which are widely employed for bonding graphite or carbon articles. Such articles often show gaps of 10 to 50 mm. along the bonded faces, which gaps are subsequently filled by tamping with a bonding mass constituted of tar or pitch, and of coke or graphite. This latter procedure has the disadvantage that the bonding agent of said tamping mass does not sufficiently wet the carbon articles, so that the bonds so achieved are not sufficiently firm. During the tamping process both the articles to be bonded and the tamping mass have to heated to temperatures of 100° to 220° C. This not only involves additional labor and costly equipment, but the work to be done is harmful to the health of the personnel due to the tar vapors produced.

The coke produced from the tamping mass is porous, of loose structure and poor strength and conduction. Accordingly, the resulting lining, even if graphite or carbon articles of advantageous properties have been incorporated, will not come up to requirements, due to the fact that the mixture of inferior quality filling out the gaps will impair the homogeneity of the lining. Accordingly, the lining will rapidly deteriorate along the gaps, the liquid or melt normally present in the equipment will penetrate the gaps where it will be chemically contaminated. As a result, the useful life of the whole equipment will be shortened. When a tamping mixture is used for bonding, the mass tamped into the gaps will be baked to coke only at high temperatures, approximately above 500° C. Below such temperatures, the tamping mixture will remain in plastic condition. As a result, there may be cases when a metallic conductor having a higher thermal expansion coefficient is embedded in the cavities of the graphite or carbon lining, and the walls of the cavities are apt to break off when the temperature increases, since the plastic tamping mixture does not exert an appropriate reaction force. This phenomenon has been encountered, for example, when the cathodes of aluminum electrolysis cells are formed.

The known binders used for bonding graphite and carbon articles have the following drawbacks:

At high temperatures the strength of bonding is low, and the bonding agents usually contain sodium silicate, or some similar component, which act in the lining as contaminants, or may lessen the specific electrical conductivity of the bonded faces.

It is the object of the invention to increase the mechanical strength, the electrical conduction and the density of carbon and graphite articles, beside eliminating the drawbacks of the known impregnating and bonding agents. These aims can be accomplished with the aid of the impregnating and/or bonding agent according to the invention. According to the invention, impregnation is carried out by means of resin composed of a mixture of a furane compound, preferably furfurol or furfuryl alcohol, and an anthracene derivative, preferably anthracene oil, and of a mineral acid, preferably phosphoric acid or titanic ester, and/or bonding is carried out by means of mixtures composed of the impregnating resin and boric oxide or boric acid, to which mixture one of the compounds of the group TiC, $TiB_2$, SiC, $B_4C$, BN, MgO, CaO, $Al_2O_3$ or powdered coke or graphite or a mixture of these components, having an optional ratio, are added as fillers.

A further characteristic of the invention consists in that the bonding agent is constituted by a mixture containing 20 to 80 percent by weight of resin, 1 to 15 percent by weight of boric oxide and/or boric acid, and a filler. The composition of the resin, calculated on its total volume, consists of 50 to 97 percent by volume of furfuryl alcohol, 1 to 30 percent by volume of anthracene oil and 2 to 10 percent by volume of phosphoric acid, or 2 to 50 percent by volume of titanium ethyl ester.

A still further characteristic of the invention is that the impregnating agent is composed of 60 to 90 percent by volume of furfurol or furfuryl alcohol, 5 to 20 percent by volume of anthracene oil, 2 to 25 percent by volume of phosphoric acid and/or 5 to 35 percent by volume of titanium ethyl ester.

The method according to the invention can be advantageously used in aluminum fusion electrolysis cells, for bonding the carbon and/or graphite and/or ceramic lining of aluminum refining cells and electric arc furnaces, in such a manner that after inserting the moulded pieces of graphite, carbon, or ceramic lining, these are subjected to a polymerization heat treatment at 80° to 250° C. for a period of 2 to 10 hours, and to subsequent baking at 300 to 1500° C. The impregnation of the graphite or carbon lining of said equipment is also performed with the above-mentioned impregnating agents, and the lining is subjected during the initial stage of heating to a polymerization heat treatment at 80° to 250° C. for a period of 2 to 10 hours, and to a subsequent baking at 300° to 1500° C.

For putting into practice the process according to the invention one proceeds in the following manner.

In order to increase the strength and/or electrical conduction of the carbon, graphite or ceramic specimens, they are impregnated, thereafter the impregnating agent which has penetrated into the pores is polymerized, and subsequently the coking of the polymerized material is performed by calcination. For preparing the impregnating agent it is preferable to select anhydrous furfurol or furfuryl alcohol as heterocyclic furane compound and to mix it first with anthracene oil as stabilizer then preferably phosphoric acid is added in small portions with constant stirring to catalyze polymerization. It is advisable to use the impregnating agent so prepared immediately. In order to avoid rapid commencement of the polymerization reaction, the mixing and impregnating operations are to be carried out at temperatures not exceeding 80° C., preferably below 20° C. Impregnation is effected at atmospheric pressure or preferably in a vacuum and/or under high pressure. In order to avoid undesired starting of the polymerization reactions, the pressure employed should not exceed 30 atmospheres. The duration of impregnation is 0.5 to 5 hours, depending on the size of the specimens to be impregnated and on the extent of the vacuum or pressure. After impregnation has been concluded, the impregnated specimen is subjected to a polymerization heat treatment at 80 to 250° C., and thereafter the baking in a neutral or reducing atmosphere at 300° to 1500° C. In order to avoid any loss of the impregnating agent, the polymerization heat treatment is advisably started immediately following the impregnation.

For bonding the carbon, graphite or ceramic bodies with each other or with metals, a bonding agent is first prepared, thereafter the faces to be bonded are coated with a layer having a thickness of about 0.5 to 5 mm., and closely compressed. The binding agent is prepared by admixing a heterocyclic furane compound, preferably anhydrous furfuryl alcohol, with anthracene oil as stabilizer, whereafter small portions of preferably phosphoric acid or titanium ethyl ester are added with constant stirring. To the furane resin thus produced the filler and the boric oxide or boric acid are then added.

The following fields of use are suggested for the process according to the invention:

Electric arc furnaces with graphite or carbon electrodes, such as are used for producing steel, ferrite alloys, corundum, carbide, or silicon, as well as for the arc fusion or the electrothermic reduction of other substances in the lining of aqueous and fusion electrolysing cells as the anode and cathode; or the production of chlorine, chlorate, sodium, aluminum or magnesium by means of electrolysis. It is particularly advantageous to apply the invention to form the cathodes of aluminum fusion electrolysis cells, as well as to form prebaked anodes for such cells, also for producing various graphite-lined apparatuses in chemical engineering, as well as for graphite pipes, valves, or armatures, and in fusion or heating furnaces with graphite rods.

EXAMPLE 1

An impregnant is prepared by mixing 65 percent by volume of furfurol, having a water content not exceeding 2 percent, at room temperature in a steel vessel, with 15 percent by volume of an anthracene oil stabilizer whereafter 20 percent by volume of concentrated phosphoric acid is gradually added with constant stirring. The dry dust-free specimens prepared for impregnation are then placed in a hermetically closed impregnating vessel, where a reduced pressure of 10 to 50 Hg mm. is maintained for a 2-hour period. With the aid thereof the impregnant is caused to penetrate the specimens, whereby the vacuum is eliminated. The vessel is then subjected to a pressure of 15 atmospheres. After a period of 1 to 2 hours the pressure is released and the impregnated specimens are removed from the vessel. It is advisable to start heat treatment of the specimens within 2 hours. The specimens are placed in a furnace for polymerization, the temperature of which is gradually raised to 200° C. in the course of 10 hours. Thereafter the specimens are baked in an inert atmosphere in such a manner that the temperature is raised to 1000° to 1100° C. and this final temperature is maintained for 5 hours. In the case of aluminum electrolysis furnaces the polymerization heat treatment and the baking are carried out upon the initial heating of the furnace.

EXAMPLE 2

One proceeds as in example 1, with the difference, however, that the impregnant is composed of 80 percent by volume of furfuryl alcohol, 15 percent by volume of anthracene oil, and 5 percent by volume of phosphoric acid.

EXAMPLE 3

One proceeds as in example 1, with the difference, however, that the impregnant is composed of 70 percent by volume of furfurol and 30 percent by volume of titanium ethyl ester.

EXAMPLE 4

A binder is produced by first preparing a furfuryl alcohol resin, to which a filler and boric trioxide are subsequently added. The furfuryl alcohol resin is prepared as described in example 2 for the impregnant, and is applied in a ratio corresponding to 45 percent by weight, calculated on the total amount of the binder mixture. The filler is composed of a mixture of equal amounts of 43 percent by weight of carbon black and graphite powder, having a particle size not exceeding 0.06 mm. at least in an amount of 40 percent by weight, whereafter 12 percent by weight of $B_2O_3$ having a particle size of at most 0.60 mm. is added. The components so prepared are stirred in an agitator until the filler is dispersed in the resin completely homogencouity. A 0.5 mm. 3 mm.-thick coat of the paste like binder so obtained is applied at room temperature on the opposite faces of the bodies to be bonded, and the faces are closely contacted. The bonded joint is then subjected to a polymerization heat treatment as described in example 1.

EXAMPLE 5

One proceeds as described in example 4, with the difference that the filler of the binder contains $Al_2O_3$, CaO or MgO as additive.

EXAMPLE 6

One proceeds as in example 4, with the difference that the composition of the binder is as follows: 20 percent by weight of furfuryl alcohol resin, 63 percent by weight of one of the members of the group of TiC, SiC, $B_4C$, BN, $TiB_2$, CaO, or MgO, and 8 percent by weight of $B_2O_3$.

EXAMPLE 7

One proceeds as in example 4, with the difference, however, that the binder has the following composition: 50 percent by weight of furfuryl alcohol resin, 45 percent by weight of powdered graphite and 5 percent by weight of $B_2O_3$.

EXAMPLE 8

One proceeds as in example 4, with the difference, however, that the composition of the binder is as follows: 40 percent by weight of furfuryl alcohol resin, 55 percent by weight of one of the members of the group of TiC, SiC, $B_4C$, BN, $TiB_2$, and 5 percent by weight of $B_2O_3$.

EXAMPLE 9

One proceeds as in example 4, with the difference, however, that the binder has the following composition: 55 percent by weight of furfuryl alcohol, 10 percent by weight of anthracene oil and 35 percent by weight of titanium containing active coke prepared by coking furforol resin containing ethyl ester. In this variant the mineral acid catalyst is replaced by the titanium compound of the activated coke.

EXAMPLE 10

The prebaked carbon lining elements of block-anode fusion electrolysis cells are impregnated as described in example 1, then the faces to be contacted are bonded when built in according to the process of example 4. The bottom lining is to be disposed in such a manner that the manufacturing pressing direction of the adjacent lining elements should correspond to the direction of the current, or diverge therefrom by not more than 20°. The inner face of the heat-insulating lining is bonded to the carbon lining, also as described in example 4. The cathode conductor and the cathode carbon block are so formed that the cavity of the cathode carbon block is larger by 2 mm. than the size of the cathode conductor, and the cathode conductor is bonded in position as described in example 4. The internal brick row of the heat-insulating lining is also impregnated by the process of example 1. The cavities of the anode carbon blocks and the current conductors to be fitted in these are formed in a manner similar to that of the cathode carbons and the cathode conductors, and their bonding is performed in accordance with example 4. The anode carbon blocks are impregnated as described in example 1. After the normal wearing of the anode carbons, their decreasing surfaces are worked smooth, and the replacement carbon blocks are bonded to these faces in accordance with the process of example 4.

After the cathode formation, the preformed blocks are subjected to polymerization and baking heat treatments in accordance with the process described in examples 1 and 4.

The advantages to be achieved by means of the invention are as follows:

When graphite and carbon articles have been impregnated according to the invention and subsequently heat treated, their electrical resistance is decreased by 15 to 20 percent whereas their mechanical strength is increased by 50 to 100, percent, depending on the quality of the starting carbon material. The useful life of the furnace linings constituted from graphite and carbon specimens is substantially increased owing to the higher chemical resistance of the carbon introduced into the pores.

When ceramics are impregnated according to the invention, their strength is also increased, as well as their resistance to the destructive effect of certain melts. The bonding according to the invention of carbon, graphite and ceramic articles equals or even exceeds the strength properties of the articles themselves. Electrical conduction is higher by 15 to 30 percent, compressive strength by 5 to 15 percent, bending strength by 10 to 15 percent in the manufacturing pressure direction of the articles than in a transverse direction. The bonding according to the invention ensures—for example in the case of carbon cathodes used in the electrolysis of aluminum melts — that the direction of the current should correspond to or only slightly diverge from its direction of pressing during manufacture, which so far had not been possible in the large-scale manufacture of carbon cathodes. This permits further reduction of strength, as referred to above. In the electrolysis of aluminum melts the improper treatment of gaps, i.e. their filling with carbon tamping of poor chemical and physical resistance is eliminated. The embedding of metallic conductors into carbon or graphite electrodes can be attained at lower costs and with a better electrical contact than hitherto, whereby the cross section of electrode current conductors can also be increased. By replacing exhausted electrodes according to the invention, economies can be made in manpower, combined with an improvement in electrical contact.

As a conclusion, one can safely say that by means of the process according to the invention the useful life of the apparatuses is lengthened, in the electrolysis of aluminum melts the constructional contact resistance of the cells as well as the contamination of the aluminum produced are lessened whereby ultimately the cost of production also becomes lower. Finally, the drop of the structural resistance involves an increase in the current intensity and the manufacturing capacity.

What we claim is:

1. An impregnating composition for increasing the strength and electrical conduction of graphite and carbon articles, consisting essentially of 60 to 90 percent by volume of a member selected from the group consisting of furfurol and furfuryl alcohol, 5 to 20 percent by volume of anthracene oil, and a catalyst selected from the group consisting of 2 to 25 percent by volume of phosphoric acid and 5 to 35 percent by volume of titanic ester.

2. A bonding composition for impregnating and bonding graphite and carbon articles to each other and to ceramic articles and to metals, consisting essentially of 20 to 80 percent by weight of an impregnating composition as claimed in claim 1 and 1 to 15 percent by weight of a member selected from the group consisting of boric acid and boric oxide, balance essentially filler.

3. A bonding composition as claimed in claim 2, said filler being a member selected from the group consisting of TiC, $TiB_2$, SiC, $B_4C$, BN, MgO, CaO, $Al_2O_3$, powdered coke, graphite and a mixture thereof.

4. A method of increasing the strength and electrical conduction of graphite and carbon articles, comprising impregnating said articles with an impregnating composition consisting essentially of 60 to 90 percent by volume of a member selected from the group consisting of furfurol and furfuryl alcohol, 5 to 20 percent by volume anthracene oil, and a catalyst selected from the group consisting of 2 to 25 percent by volume of phosphoric acid and 5 to 35 percent by volume of titanic ester, heating said articles to a temperature in the range 80° to 250° C. for 2 to 10 hours, and then heating said articles in the range 300° to 1,500° C. until said articles are carbonized.

5. A method of bonding graphite and carbon articles to each other and to ceramic articles and to metals, comprising applying to said articles a mixture of 20 to 80 percent by weight of said composition of claim 4, 1 to 15 percent by weight of a member selected from the group consisting of boric acid and boric oxide, balance essentially filler, heating said articles to a temperature in the range 80° to 250°C. for 2 to 10 hours, and then heating said articles to a temperature in the range 300° to 1500°C. until said articles are carbonized.

6. A method as claimed in claim 5, said filler being selected from the group consisting of TiC, TiB$_2$, SiC, B$_4$C, BN, MgO, CaO, Al$_2$O$_3$, powdered coke, graphite and a mixture thereof.

7. A method as claimed in claim 5, in which said impregnation with said composition and said bonding are carried out simultaneously.